3,484,263
METHOD OF FORMING SEMITRANSPARENT COATING OF GOLD ON GLASS SURFACE
Akira Kushihashi, Nishinomiya-shi, and Kenji Fujiwara, Osaka, Japan, assignors to Nippon Sheet Glass Co., Ltd., Osaka, Japan
No Drawing. Filed Dec. 16, 1966, Ser. No. 602,170
Claims priority, application Japan, Dec. 28, 1965, 40/80,383
Int. Cl. C23c *3/02;* B32b *15/04;* C22b *11/04*
U.S. Cl. 117—33.3      5 Claims

ABSTRACT OF THE DISCLOSURE

Method of forming on glass a homogeneous semi-transparent gold coating having high thermic ray reflectance. The glass pretreated with an aqueous stannous salt according to the ordinary mirroring technique is contacted with an alkaline aqueous solution containing a water-soluble gold salt and reducing agent at a temperature not exceeding 10° C. After the maintenance of the contact for about 0.5 to 5 minutes the contacting interface is subjected to radiation of 2500–5000 A., thereby promoting the reduction of the gold salt to gold. The radiation is continued until a semi-transparent coating with a thickness of 150–500 A. is formed.

---

This invention concerns a method of forming a semi-transparent coating of gold on the surface of glass.

It has been known that when the surface of glass is contacted with an aqueous solution of a gold salt and a reducing agent, the gold salt is reduced to precipitate gold whereby a coating of gold is formed on the surface of glass. If the so formed coating is appropriately thin, visible rays are considerably passed therethrough but most of the thermic rays are reflected. The glass coated with such a semitransparent gold film, when used as window glass for buildings and cars, is sufficient to transmit visible rays and prevents the intrusion of thermic rays. Advantageously, therefore, rooms are comfortable and the curtailment of cost for controlling air is made possible.

The gold coating on the glass surface, which is capable of transmitting visible rays, is extremely thin. Even a slight unevenness of the thickness of the thin coating on the glass surface is very detrimental to the outer appearance and causes images through the glass to be distorted. The thickness of the gold coating should, therefore, be uniformalized as much as possible. If a non-transparent gold coating such as a gold mirror is intended, the gold coating is thick and the existence of some unevenness does not impede the outer apperance. But with a semitransparent gold coating, the uniformity of thickness is of utmost importance.

One of the main objects of this invention is to provide a method of forming an even semi-transparent coating of gold on the surface of glass.

One particular object of this invention is to provide a semitransparent glass product of excellent thermic ray reflecting property which has a reflectance at a wavelength of $0.90\mu$ of about 65% or higher.

The method of forming a gold semitransparent coating on the surface of glass according to this invention comprises contacting the surface of glass with an alkaline aqueous solution containing a water-soluble gold salt and reducing agent at a temperature not higher than 10° C., maintaining the said contacting for 0.5 to 5 minutes at a temperature between the freezing point of the said aqueous solution and 10° C., subjecting the contacted interface to the irradiation of rays of short wavelength within the range of 2500 A. to 5000 A. to thereby accelerate the reduction of the gold salt to gold, and continuing the irradiation until a semi-transparent gold coating of a thickness within the range of 150 A. to 500 A. is formed on the glass surface.

Heretofore, when a gold coating is precipitated on the surface of glass, the glass surface has been activated by application of a solution of a metal salt of lower reducing power such as silver and palladium before applying a plating solution of gold to the surface of glass. On the other hand, in accordance with the method of this invention, the activation of the glass surface is performed with the use of a gold plating solution itself. This self-activation by a plating solution itself is carried out by maintaining the contacting of the glass surface with the plating solution for 0.5 to 5 minutes before subjecting the system to a condition such that the formation of a gold coating may proceed at a practical speed. It has been found that the self-activation at a temperature higher than 10° C. not only gives a final gold coating having a non-uniform thickness and many irregularities, but also produces a product in which particles of gold within the gold coating are coarse and which therefore has a small thermic ray reflectance. Products obtained by the self-activation at a temperature higher than 10° C. exhibit a thermic ray reflectance smaller than those of the products of this invention having the same degree of transmission of visible rays. The time needed to perform self-activation of this invention depends upon the temperature, and in most cases, may be about 1 to 3 minutes. But when the temperature is close to its upper limit, satisfactory results can sometimes be obtained from the activating time of about 30 seconds. The upper limit of the activating time is not so critical, but time longer than 5 minutes is not practical.

A mercury lamp is suitable and easy to operate as a light source to produce short wavelength rays used in the irradiation operation. As the gold salt, inorganic salts such as chloroauric acid and gold chloride are used. Preferable reducing agents are formalin and glucose, but tartaric acid, hydrazine sulfate and Rochelle salt can also be used. As the alkali to promote reduction, alkali carbonate such as sodium carbonate and potassium carbonate are preferable as the control of the thickness of gold coating is easy.

The constituents of the aqueous solution are as follows:

| | Parts by weight |
|---|---|
| Chloroauric acid ($HAuCl_4 \cdot 4H_2O$) | 0.5–20 |
| Sodium carbonate | 2–180 |
| Glucose | 0–60 |
| Formalin (more than 37%) (cc.) | 0–20 |
| Water | 1000 |

Expecially preferable constituents of the solution are as follows:

| | Parts by weight |
|---|---|
| Chloroauric acid tetrahydrate | 0.5–10 |
| Sodium carbonate | 2–80 |
| Glucose | 0.01–20 |
| Formaldehyde (as formalin) | 0.01–5 |
| Water | 1000 |

Just as in the production of mirrors, the surface of glass is pre-treated with a solution of tin salt such as tin chloride prior to contacting gold salt with the surface of glass.

immediately thereafter in the temperature indicated in Table 1, the plate was irradiated with a high pressure mercury lamp (400 w.) from a distance about 60 cm. away.

TABLE 1

| Sample | Temperature of aqueous solution °C. | Irradiation by high pressure mercury lamp | Activating time before irradiation (min.) | Color tone of coating by transmission light | Optical properties of coating (percent) | | Thickness of coating (A.) |
|---|---|---|---|---|---|---|---|
| 1 | 5 | Not done | | In 15 minutes, a blue coating was precipitated. Thereafter, the thickness did not increase. | $R_{0.9}$ $T_{0.55}$ | (15–10) (70–53) | 130–120 |
| 2 | 5 | Done | 0 | A yellowish green coating was partly precipitated 4 min. after irradiation. | $R_{0.9}$ $T_{0.55}$ | (70–53) (38–52) | 320–200 |
| 3 | 5 | do | 2 | A homogeneous yellowish green coating was precipitated 4 minutes after irradiation. | $R_{0.9}$ $T_{0.55}$ | (79–78) (38–39) | 345–340 |
| 4 | 20 | Not done | | In 2 minutes, a yellowish green coating was precipitated partly. | $R_{0.9}$ $T_{0.55}$ | (72–56) (38–52) | 350–220 |
| 5 | 20 | do | 0 | One minute after irradiation, a yellowish green coating was partly precipitated. | $R_{0.9}$ $T_{0.55}$ | (72–44) (38–56) | 300–170 |
| 6 | 20 | do | 1 | 30 seconds after irradiation, a yellowish green coating was precipitated partly. | $R_{0.9}$ $T_{0.55}$ | (73–65) (42–44) | 330–250 |

NOTE.—$R_{0.9}$ shows the maximum and minimum value of the reflectance at a wavelength of $0.9\mu$ measured at every portion. $T_{0.55}$ shows the maximum and minimum value of the percent transmission at a wavelength of $0.55\mu$ measured at every portion.

The invention will hereinafter be illustrated by way of examples.

EXAMPLE 1

The surface of a glass plate with a size of 2 m. x 1 m. to be coated with gold was cleansed with a distilled water. A 0.05% solution of tin chloride was poured onto the surface at room temperature and allowed to stand for 3 minutes, followed by washing with water.

The so pre-treated glass was placed with its surface being maintained horizontal, and a solution consisting of 1 g. of chloroauric acid, 30 g. of sodium carbonate, 10 g. of glucose and 1000 cc. of water was poured thereon at a temperature of 10° C. When the solution was spread all over the glass surface, the glass plate was oscillated for one minute at this temperature in a horizontal direction. After one minute, while continuing the oscillation, it was irradiated with a high pressure mercury lamp (400 w.) from a distance 60 cm. away. When the irradiation was continued for 3 minutes, a uniform semi-transparent coating of gold with a thickness of about 280 A. was obtained. The glass with the resulting semi-transparent gold coating had a percent transmission of 45% at the wavelength of $0.55\mu$, and a reflectance of 70% at a wavelength of $0.90\mu$.

EXAMPLE 2

A glass plate pre-treated in the same manner as in Example 1 was placed horizontally, and a solution consisting of 3 g. of chloroauric acid, 30 g. of sodium carbonate, 10 cc. of 37% formalin and 1000 cc. of water was applied thereto in the form of spray by means of an anti-acid spray gun at a temperature of 8° C. When the solution was spread all over the glass plate was allowed to stand at this temperature for about 2 minutes. Thereafter, it was irradiated with a high pressure mercury lamp (400 w.) for 5 minutes from a distance 80 cm. away. The glass plate with the resulting semi-transparent gold coating with a thickness of about 250 A. had a percent transmission of 47% at a wavelength of $0.55\mu$ and reflectance of 65% at a wavelength of $0.90\mu$.

EXAMPLE 3

A glass plate pre-treated in the same manner as in Example 1 was placed horizontally, and a plating solution consisting of 3.0 g. of $HAuCl_4 \cdot 4H_2O$, 12.0 g. of $Na_2CO_3$, 0.8 g. of glucose, and 1.5 cc. of 37% formalin, and 1000 cc. of water was applied in the form of spray by means of an anti-acid spray gun. After having been allowed to stand for the time indicated in Table 1 or In Table 1, Sample 3 is in accordance with the method of this invention, and other samples are all controls. Table 1 will indicate that Sample 3 according to this invention has a larger $R_{0.9}$ value and very uniform $R_{0.9}$ and $T_{0.55}$ values, and that Sample 3 has a very uniform thickness of coating.

We claim:

1. In a method of forming a semi-transparent coating of gold on the surface of glass, which comprises contacting the surface of glass with an alkaline aqueous solution containing a water-soluble gold salt and reducing agent, maintaining the said contacting for 0.5 to 5 minutes, subjecting the contacting interface to the irradiation of short wave rays of a wavelength within the range of 2500 to 5000 A. to thereby accelerate the reduction of the gold salt to gold at the interface, and continuing the irradiation until a semi-transparent coating of gold with a thickness of 150 to 500 A. is formed on the surface of glass, the improvement wherein said solution is maintained at a temperature not higher than 10° C.

2. A method according to claim 1 wherein the said alkaline aqueous solution of gold salt is a solution containing a water-soluble gold salt, alkali metal carbonate and at least one reducing agent chosen from the group of glucose and formaldehyde.

3. A method according to claim 2 wherein the alkaline aqueous solution of gold salt is a solution containing 1000 parts by weight of water, 0.5 to 20 parts by weight of a water-soluble gold salt, 2 to 180 parts by weight of an alkali metal carbonate, up to 60 parts by weight of glucose and up to 7.4 parts of formaldehyde.

4. A method according to claim 1 wherein the surface of glass is pre-treated with an aqueous solution of tin salt.

5. A method of forming a semi-transparent coating of gold on the surface of glass, which comprises treating the surface of glass with an aqueous solution of tin salt, contacting the pre-treated glass surface with an aqueous solution of a temperature not higher than 10° C. containing 1000 parts by weight of water, 0.5 to 10 parts by weight of chloroauric acid tetrahydrate, 2 to 80 parts by weight of sodium carbonate, 0.01 to 20 parts by weight of glucose and 0.01 to 5 parts by weight of formaldehyde, maintaining the said contacting for 0.5 to 5 minutes at a temperature between the freezing point of the said aqueous solution and 10° C., subjecting the contacting interface to the irradiation of short wave rays of a wavelength within the range of 2500 to 5000 A. to thereby accelerate the reduction of the gold salt to gold at the interface, and continuing the irradiation until a semi-transparent coating of gold with a thickness of 150 to 500 A. is formed on the surface of glass.

References Cited

UNITED STATES PATENTS

| | | |
|---|---|---|
| 1,953,330 | 4/1934 | Andres _____ 117—105.5 X |
| 2,511,472 | 6/1950 | Kmecik. |
| 2,723,919 | 11/1955 | Pohnan. |
| 2,762,714 | 9/1956 | Smith et al. |
| 3,346,404 | 10/1967 | Gardner et al. _____ 106—1 |

U.S. Cl. X.R.

106—1; 117—35, 54, 93.3, 124

ALFRED L. LEAVITT, Examiner

J. H. NEWSOME, Assistant Examiner